US009599804B2

(12) United States Patent
Birk et al.

(10) Patent No.: US 9,599,804 B2
(45) Date of Patent: Mar. 21, 2017

(54) SYSTEM AND METHOD FOR COMPUTER-CONTROLLED EXECUTION OF AT LEAST ONE TEST IN A SCANNING MICROSCOPE

(75) Inventors: Holger Birk, Meckesheim (DE);
Volker Seyfried, Nussloch (DE);
Roland Moschel, Neustadt/Weinstrasse
(DE); Derek Webster, Mannheim (DE);
Harald Brueggemann, Mannheim
(DE); Mario Belzer,
Edingen-Neckarshausen (DE)

(73) Assignee: Leica Microsystems CMS GmbH,
Wetzlar (DE)

( * ) Notice: Subject to any disclaimer, the term of this patent is extended or adjusted under 35 U.S.C. 154(b) by 712 days.

(21) Appl. No.: 13/302,025

(22) Filed: Nov. 22, 2011

(65) Prior Publication Data

US 2012/0130670 A1 May 24, 2012

Related U.S. Application Data

(63) Continuation of application No. PCT/EP2010/003121, filed on May 21, 2010.

(30) Foreign Application Priority Data

May 22, 2009 (DE) ........................ 10 2009 022 394

(51) Int. Cl.
*G02B 21/00* (2006.01)
*G02B 21/36* (2006.01)

(52) U.S. Cl.
CPC ......... *G02B 21/008* (2013.01); *G02B 21/365* (2013.01)

(58) Field of Classification Search
CPC .................................................. G02B 21/002
(Continued)

(56) References Cited

U.S. PATENT DOCUMENTS 6,278,783 B1 * 8/2001 Kocher et al. ................. 380/277
6,928,490 B1 * 8/2005 Bucholz ................ G06F 19/327
340/12.32

(Continued)

FOREIGN PATENT DOCUMENTS

CN 2416510 Y 1/2001
CN 1459737 A 12/2003
(Continued)

OTHER PUBLICATIONS

International Search Report, mailed on Aug. 26, 2010, from International Application No. PCT/EP2010/003121, filed on May 21,2010.

*Primary Examiner* — Manual Rivera Vargas
(74) *Attorney, Agent, or Firm* — Patentbar International, P.C.

(57) ABSTRACT

The invention relates to a method and a system for central computer controlled execution of at least one test run in a scanning microscope, particularly a confocal microscope, wherein at least one first software module of an application software is tested. The invention achieves the aim by a network made of individual scanning microscope clients and a central server. The clients can be contacted via a network interface and are administered in a central directory in the server. The application software for the individual components of a scanning microscope is made of individual software modules, each associated with a potential test. In order to be able to perform the various tests, the scanning microscope clients have been equipped on the hardware side with additional sensors and components that allow various operating parameters to be determined.

16 Claims, 3 Drawing Sheets

(58) Field of Classification Search
USPC .......................................................... 702/122
See application file for complete search history.

(56) References Cited

U.S. PATENT DOCUMENTS

| | | | |
|---|---|---|---|
| 2004/0141637 A1* | 7/2004 | Bacus et al. .................. | 382/128 |
| 2006/0102841 A1* | 5/2006 | Schek .......................... | 250/311 |
| 2006/0159367 A1 | 7/2006 | Zeineh et al. | |
| 2007/0291277 A1* | 12/2007 | Everett .................. | A61B 3/102 |
| | | | 356/497 |
| 2011/0069379 A1* | 3/2011 | Becker et al. ................ | 359/368 |

FOREIGN PATENT DOCUMENTS

| | | |
|---|---|---|
| DE | 101 60 172 A1 | 6/2003 |
| DE | 10 2007 024 075 A1 | 11/2008 |
| EP | 1288862 A2 | 3/2003 |
| EP | 1 496 384 A2 | 1/2005 |
| JP | 2004101871 A | 4/2004 |
| JP | 2005117640 A | 4/2005 |
| JP | 2007003844 A | 1/2007 |
| JP | 2007263730 A | 10/2007 |
| JP | 2008046361 A | 2/2008 |
| JP | 2009506351 A | 2/2009 |
| WO | 99/30264 A1 | 6/1999 |
| WO | 99/42885 A2 | 8/1999 |
| WO | 01/54052 A1 | 7/2001 |
| WO | 200/042572 A2 | 4/2008 |

* cited by examiner

SYSTEM AND METHOD FOR COMPUTER-CONTROLLED EXECUTION OF AT LEAST ONE TEST IN A SCANNING MICROSCOPE

RELATED APPLICATIONS

This application is a Continuation of PCT application number PCT/US2010/003121 filed on May 21, 2010, claims priority to German Patent Application No. DE 10 2009 022 394.0 filed on May 22, 2009, both of which are incorporated herein by reference in their entirety.

BACKGROUND OF THE INVENTION

The invention relates to a method and a system for the central computer-controlled execution of at least one test run in a scanning microscope, particularly a confocal microscope, wherein at least one first software module of an application software is tested.

SUMMARY OF THE INVENTION

In scanning microscopy, a sample of a microscopic preparation is point-scanned with a light beam. Normally, lasers are used as the light sources. Mixed gas lasers, diode lasers, solid lasers and also so-called white light lasers may be used. White light lasers have the advantage that a spectrally broad continuous light spectrum is obtained.

Moreover, a confocal microscope is provided with a workstation computer that is connected via various interfaces to the components of the scanning microscope such as the detector, the detection pinhole, acousto-optic components having a programmable beam splitter such as an AOBS, acousto-optic components that operate selectively on individual wavelengths as a function of the radiofrequencies beamed in, such as an AOTF, the scanner and other components. The microscope is controlled by means of application software through this workstation computer, this being a decentralized island solution. If problems arise with the equipment, a service engineer has to be informed who will try to solve the problems on site. However, this is very expensive as the technician has to travel, even if it subsequently turns out that the problem is a simple technical one that could have been solved by the relevant operator.

The problem of the invention is to provide a system and a method by means of which a remote test of at least one software module can be carried out by the application software in a simple manner. In particular, the operating parameters of a scanning microscope are to be determined by a remote test. This is intended to ensure optimum functioning of a scanning microscope for the user.

This problem is solved by a system having the features of claim 1 and a method having the features of claim 7. Advantageous embodiments of the invention are recited in the dependent claims.

The invention solves the problem by means of a network consisting of individual scanning microscope clients and a central server. The clients can be addressed via a network interface and are managed in a central directory in the server. The application software for the individual components of a scanning microscope consists of individual software modules each of which are associated with a possible test. To enable the different tests to be carried out, the scanning microscope clients have been equipped, on the hardware side, with additional sensors and components that make it possible to determine different operating parameters.

Further features and advantages of the invention will become apparent from the following description that provides a fuller explanation in conjunction with the attached drawings by reference to an embodiment by way of example.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
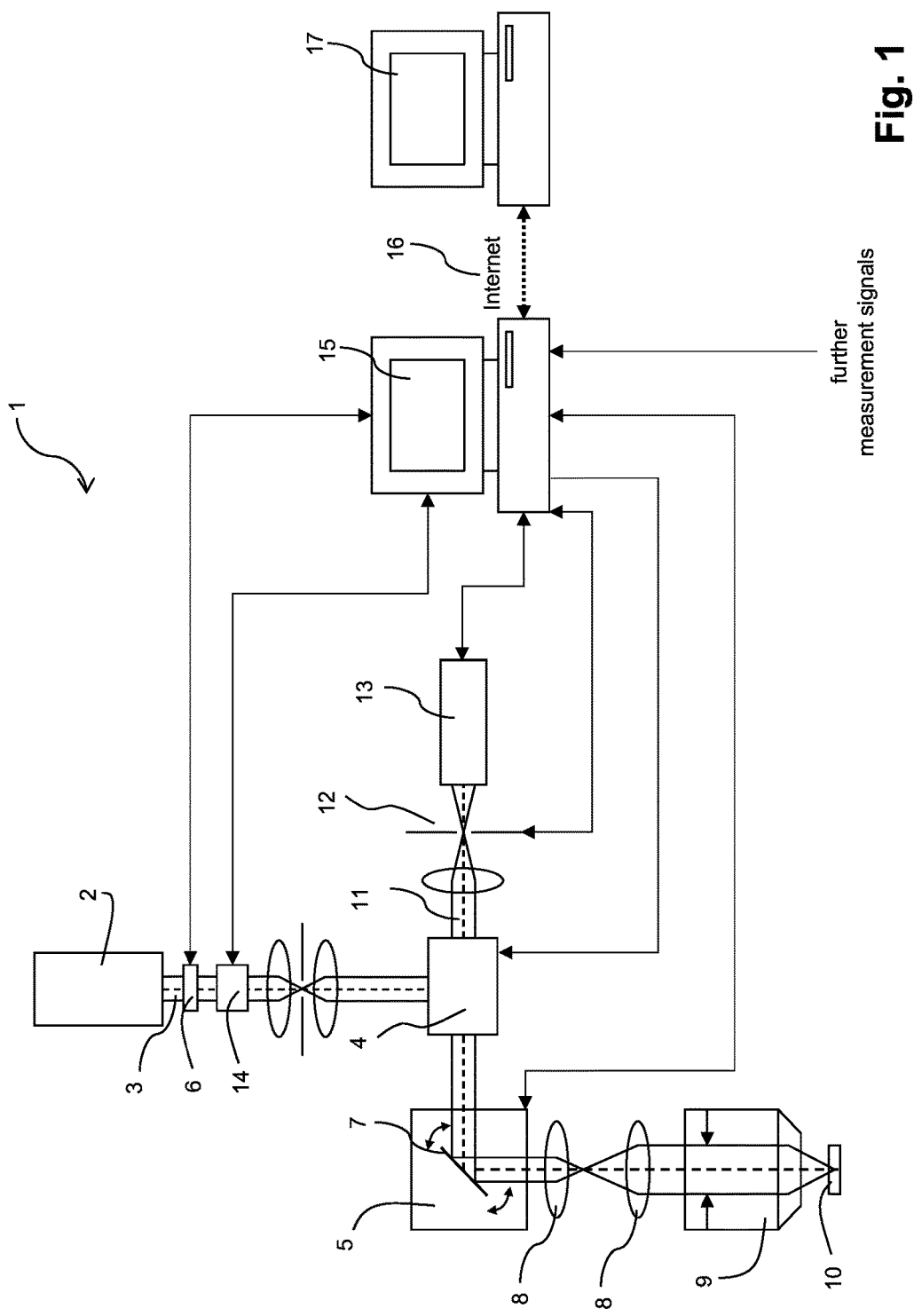
FIG. 1 is a schematic representation of a scanning microscope having a workstation computer and an internet connection for carrying out remote testing.

FIG. 1 shows the schematic structure of a confocal scanning microscope 1. The illuminating light beam 3 coming from a laser 2 is guided by a beam splitter 4, embodied as an AOBS in this case, or another suitable deflector, to a scanning device 5. Before the illuminating light beam 3 strikes the beam splitter 4, it passes through an illuminating pinhole 6. The scanning device comprises at least one scanning mirror 7 which guides the illuminating light beam 3 through an optical scanning device 8 and an optical microscope device 9 over or through an object 10. The scanning mirror 7 is driven by a motor (not shown here). The illuminating light beam 3 is guided over the surface of the object, in the case of non-transparent objects 10. In the case of biological objects 10 or transparent objects, the illuminating light beam 3 may also be passed through the object 10. For this purpose, non-luminescent preparations may be prepared with a suitable dye and these dyes present in the object 10 are excited by the illuminating light beam 3 and transmit luminescence and/or fluorescent light in a range of the spectrum that is characteristic of them. This light emanating from the object defines a detection light beam 11. This passes through the optical microscope device 9, the optical scanning device 8 and the scan module 5 to the deflector means 4, passes through the latter and through a detection pinhole 12 to the detector unit 13. The detector unit may consist of at least one photomultiplier. It is also conceivable that the detector unit 13 consists of a photomultiplier array or a CCD chip, an EMCCD chip or an APD array. In the detector unit, electrical detection signals are produced that are proportional to the power of the light emanating from the object 10. As light is not emitted by the object 10 at only one wavelength, it is sensible to provide a dispersive element in front of the detector unit. The dispersive element splits the detection light beam spectrally, so that the individual wavelengths of the detection light are spatially separated. If the laser 2 itself also comprises a plurality of illuminating wavelengths, particularly when it is a so-called white light laser, an acousto-optic component such as an AOTF 14 is also provided, with which the desired wavelength can be selected from the wavelength spectrum.

For computer-aided control of the individual components, a workstation computer 15 is provided which has various interfaces for the individual components of the equipment. Installed in the computer 15 is application software that consists of various software modules for the individual components of the equipment. The computer 15 is connected to a control server 17 via an internet connection 16. In this way the individual scanning microscopes can be addressed via a network interface and managed in a central directory. At present an optimum solution for this is JINI technology. JINI is a framework for programming distributed applications that impose particular demands on the scalability and complexity of collaboration between the various components and cannot be operated by existing methods. JINI was developed by Sun Microsystems based on the programming language Java. JINI encompasses a directory service with which equipment functions and other services can be located. The directory service then supplies both the network address and also the necessary interface descriptions; the equipment and other services are called up by "remote method invocation".

However, even in this solution, there is still the problem of the configuration of the decentralized equipment and services. In scanning microscopes, however, this technology has not been applied hitherto, as sufficiently fast internet connections or sufficient computer capacity have not been available up till now. In contrast to a conventional software update in a network solution of different clients and services in a network, in test runs in confocal laser scanning microscopy, image data have to be evaluated, in particular, so as to arrive at a result relating to the method of operation of the microscope. This is however so high because of the quantity of data to be processed and the computing speed required that the use of JINI technology, for example, has not been thought of up till now. Furthermore, additional components for detecting operating parameters which now for the first time allow operating parameters to be determined on the hardware side have not hitherto been integrated in conventional confocal laser microscopes.

The laser scanning microscope has therefore been expanded according to the invention to include components that allow automatic determination and detection of different operating parameters.

Figure 2:
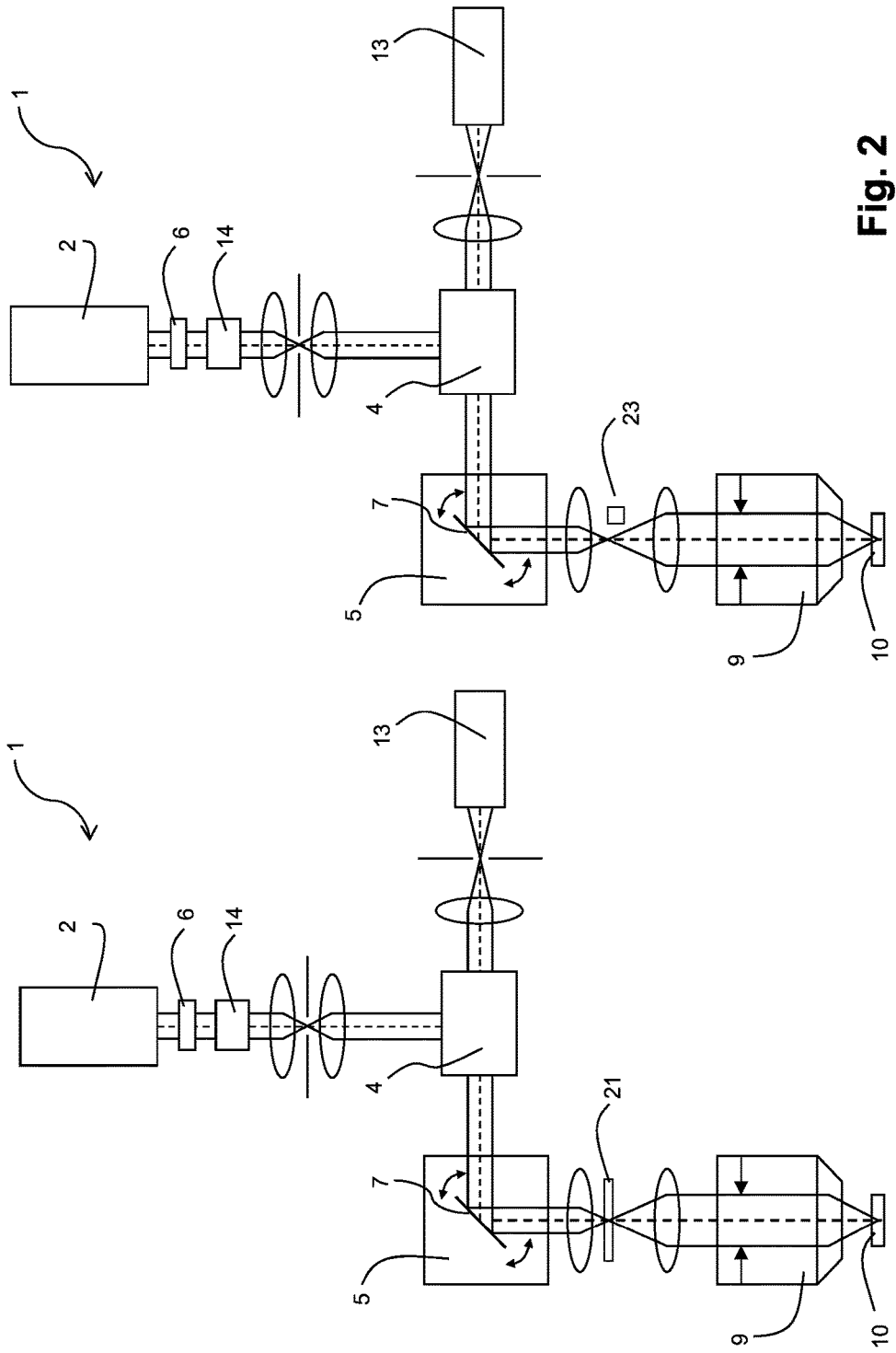
FIG. 2 is a schematic representation of a scanning microscope having a swivellable mirror and a reference diode for executing a test run of the AOBS.

FIG. 2 illustrates this for a beam splitter (AOBS) test: Mirrors and pole filters 21 introduced into the intermediate image and an integrated reference diode 23 make it possible to test the beam path through the AOBS 4. The correct calibration can be determined from different setting parameters and the resulting intensity values on the detector 13.

Figure 3:
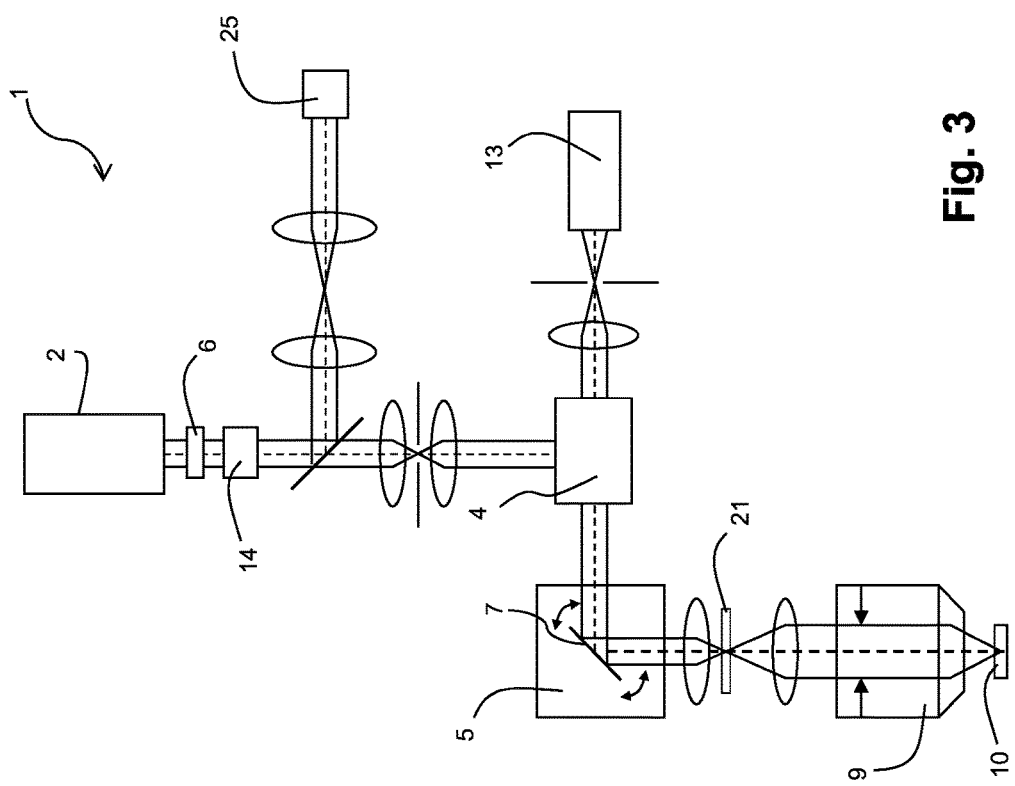
FIG. 3 is a schematic representation of a scanning microscope having a reference diode for executing a test run of the detector.

FIG. 3 shows a detector test that is made possible by an integrated light source 25. An LED 25 or other light source in the vicinity of the light-sensitive surface of the detector is able to simulate a signal. Using the detected signal in the detector 13, the entire signal pathway from the LED 25 to the detector 13 can be tested.

Moreover, additional tests are possible. Thus, the galvanometers in the scanning unit 5 can be tested: Using a test structure that can be introduced into the beam path by motorized control at the position of the intermediate image it is possible to check the size of the scanning field and hence the function of the galvanometers of the scanner 5.

It is possible to test the laser or the AOTF by means of the reference diode behind the AOTF. This can be used to check the AOTF calibration and the laser function. Moreover, conclusions can be drawn as to the life of the laser and AOTF from the timing of the laser performance measured and the specification values. In addition, it is also possible to equip some lasers with an operating hour counter that is then read off.

The spectrometer can be tested by comparing the wavelengths emitted by the laser with those actually measured by the equipment.

A pinhole test is made possible by a mirror at the position of the intermediate image. Using an internal detector, the intensity of the light as a function of the pinhole diameter is determined. The correct adjustment of the pinhole can be read off from the results.

The stepping motors in the microscope can be tested using the electronic controls: The electronic controls of the stepping motors can be used to interrogate open or short-circuited connections. Step losses can be detected in a deliberate back and forth motion followed by a search for the original position.

The beam path in the microscope can be altered or switched using various shutters. The position of the shutters can be determined or interrogated optically, magnetically or using other detectors or sensors. It is also possible for an alarm signal to be emitted in the event of a defective shutter, for reasons of laser safety.

According to the invention, the tests mentioned by way of example here are carried out remotely in a confocal laser scanning microscope from a central server. Thus a particular test may be associated with a software module in the application software. These software modules of the application software are listed in a configuration file which is in turn stored centrally in the server, from where it can be called up. Then different software modules of a particular scanning microscope can be called up independently of one another. For the interplay between the central server and the different scanning microscope clients in a network, numerous variants are possible:

Thus, advantageously, the execution and transmission of the test results for a scanning microscope client are carried out according to a test plan. For example, for each test with a scanning microscope client a time interval is defined after which a repetition is carried out. As far as possible, only as many tests are carried out as will not interfere with normal use.

The test results are then transmitted automatically to the one central control server 17 and stored in a "Remote Diagnosis Databank". However, the test results may also be stored directly on the scanning microscope client. The results for the different scanning microscope clients are compared with one another. The evaluation of the collected data is then carried out for example from the point of view of maximum breakdown-free time and/or maximum performance of the equipment in the field. This comprises, for example, the automatic introduction of suitable measures, e.g. recommendations to order replacement parts, using self-diagnosis. The expected service lives of the lasers may be estimated in advance, for example, or optimized service implementation plans for the most critical equipment may be drawn up.

The "Remote Diagnosis Databank" may, of course, also be linked to other databanks so that it is possible for example to call up acceptance reports, SAP data, support requests, board audits and the like.

Moreover, statistics can be put together using the operating parameters in the field. In this way, any deviations from the norm or weaknesses in the equipment can be detected and then a targeted service can be carried out. It is also possible to carry out an analysis of the user behavior, evaluation of which leads to the optimization of typical processes in particular types of experiment.

By the automatic determination and detection of operating parameters of a (confocal) laser scanning microscope, the average breakdown-free time can be substantially lengthened overall. This includes both the transmission of simple tests and measurement data (e.g. from log files) and also self-tests/performance tests carried out according to a test plan at specific times.

The most important aspect is that a first diagnosis is automatically provided remotely, i.e. without the need for a site visit by a service engineer. Ideally, deviations in the parameters and hence impending breakdown are detected before an actual fault occurs that is noticeable by the user.

The entire history of the boards built into the equipment can be traced using individual readable serial number chips provided on each board.

For example, the temperatures and the flow rate and levels of coolant at different points in the equipment and the supply voltages to the individual components at regular intervals are transmitted as direct measurements. The storage space available, the regulating parameters of the galvanometers and other calibration values can also be determined directly and transmitted.

An essential component of the remote diagnosis in laser scan microscopes are the self-tests that are carried out automatically. These are carried out for example at the start of a scanning microscope client (preferably tests of short duration for some equipment components) or when the equipment is shut down. However, the equipment can also detect when no measurement and no user action have taken place over a lengthy period of time, and then use these phases (idle phase) for complex self-tests.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for a computer-controlled central execution of a test for determining operating parameters for a scanning microscope client using a central control server, wherein an equipment component of the scanning microscope client is tested, the system comprising:
   the scanning microscope client;
   the central control server;
   a network interface of a workstation computer of the scanning microscope client adapted to be connectable to the central control server;
   a first of a plurality of software modules of an application software for the scanning microscope client, said application software being stored on the central control server and being adapted to execute a test of a first of a plurality of equipment components; and
   a sensor in the scanning microscope client used during execution of the test to sense the operating parameters of the first of the plurality of equipment components in association with the first of the plurality of software modules,
   wherein the test comprises a self-test of the first of the plurality of equipment components of the scanning microscope client to be carried out automatically at a predetermined time,
   wherein the plurality of equipment components includes a galvanometer, a beam splitter, a detector, a laser, a pinhole, a stepping motor and a shutter, and
   wherein test results of the self-test of the scanning microscope client are automatically transmitted to the central control server and stored in a Remote Diagnosis Database,
   wherein the test of each different equipment component is associated with a different one of the plurality of software modules.

2. The system according to claim 1, wherein the scanning microscope client is managed in a central directory in the central control server.

3. The system according to claim 1, wherein the sensor is a reference diode for a detector test.

4. The system according to claim 1, wherein the sensor is a swivellable mirror for an acousto-optic beam splitter test.

5. The system according to claim 1, wherein the scanning microscope client is managed in the central control server using JINI technology, wherein JINI technology is a framework for programming distributed applications and encompasses a directory service with which equipment functions and other services can be located.

6. The system according to claim 1, wherein a communication between the central control server and the scanning microscope client takes place via http protocols.

7. The system according to claim 1, wherein the test further comprises another self-test of the operating parameters of the scanning microscope carried out automatically according to a test plan at a specific time.

8. The system according to claim 1, wherein the test further comprises another self-test of operating parameters of the scanning microscope carried out during an idle phase of the scanning microscope client when no measurement and no user action have taken place.

9. The system according to claim 1, wherein the plurality of equipment components further comprises a spectrometer.

10. A method for operating a system for computer-controlled central execution of a test for determining operating parameters for a scanning microscope client with a test sensor using a central control server, wherein the system comprises the central control server and a network interface of a workstation computer of the scanning microscope client adapted to be connectable to the control server, the method comprising the steps of:
   running, on the workstation computer, a first software module of an application software stored on the central control server for the scanning microscope client for execution of the test being a self-test of a first hardware equipment component of the scanning microscope;
   actuating the test sensor in the scanning microscope client to sense the operating parameters of the first hardware equipment component in accordance with the application software of the first software module for testing the first hardware equipment component, and processing data determined centrally in the control server; and
   automatically transmitting test results of the self-test by the first software module of the first hardware component of the scanning microscope client to the central control server and storing the test results in a Remote Diagnosis Database of the central control server, wherein the test is carried out at a start of the scanning microscope client; and wherein the first hardware equipment component, as tested by the application software of the first software module, is selected from the group consisting of a galvanometer, a beam splitter, a spectrometer, a detector, a laser, a pinhole, a stepping motor and a shutter.

11. The method according to claim 10, wherein the first software module is managed in a directory on the control server.

12. The method according to claim 10, wherein the first software module is stored in the scanning microscope client.

13. The method according to claim 10, wherein test procedures are carried out remotely.

14. The system according to claim 10, wherein the test further comprises another self-test of operating parameters of the scanning microscope carried out automatically according to a test plan at a specific time.

15. The system according to claim 10, wherein the test further comprises another self-test of operating parameters of the scanning microscope carried out during an idle phase of the scanning microscope client when no measurement and no user action have taken place.

16. A system for a computer-controlled central execution of a test for determining operating parameters for a scanning microscope client using a central control server, wherein an equipment component of the scanning microscope client is tested, the system comprising:

a central control server;

a network interface of a workstation computer of the scanning microscope client adapted to be connectable to the central control server;

a sensor in the scanning microscope client being used to sense an operating parameter of the equipment component for execution of the test;

a first software module of an application software for the scanning microscope client, the first software module being adapted to execute the test in response to the sensor sensing the operating parameter of the equipment component of the scanning microscope client;

wherein the test comprises a self-test of the scanning microscope client carried out with a start of the scanning microscope client, or carried out automatically according to a test plan at a specific time, or carried out during an idle phase of the scanning microscope client, and wherein test results of the test of the equipment component of the scanning microscope client are automatically transmitted to the central control server and stored in a Remote Diagnosis Database of the central control server; and wherein the first hardware equipment component, as tested by the application software of the first software module, is selected from the group consisting of a galvanometer, a beam splitter, a spectrometer, a detector, a laser, a pinhole, a stepping motor and a shutter.

* * * * *